United States Patent
Zheng et al.

(10) Patent No.: US 11,760,671 B2
(45) Date of Patent: Sep. 19, 2023

(54) METHOD FOR CONTROLLING GROWTH OF BLUE ALGAE IN WATER AREA BY UTILIZING EUCALYPTUS

(71) Applicant: FUDAN UNIVERSITY, Shanghai (CN)

(72) Inventors: Zheng Zheng, Shanghai (CN); Wei Zhao, Shanghai (CN); Xingzhang Luo, Shanghai (CN); Jian He, Shanghai (CN); Weizhen Zhang, Shanghai (CN); Li Xu, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 231 days.

(21) Appl. No.: 17/416,230

(22) PCT Filed: Mar. 28, 2019

(86) PCT No.: PCT/CN2019/080177
§ 371 (c)(1),
(2) Date: Jun. 18, 2021

(87) PCT Pub. No.: WO2020/147201
PCT Pub. Date: Jul. 23, 2020

(65) Prior Publication Data
US 2022/0041482 A1 Feb. 10, 2022

(30) Foreign Application Priority Data
Jan. 5, 2019 (CN) .......................... 201910041916.4

(51) Int. Cl.
C02F 3/32 (2023.01)
C02F 3/02 (2023.01)
(Continued)

(52) U.S. Cl.
CPC ................ C02F 3/327 (2013.01); C02F 3/02 (2013.01); C02F 3/34 (2013.01); C02F 1/281 (2013.01);
(Continued)

(58) Field of Classification Search
CPC .... C02F 3/327; C02F 3/02; C02F 3/34; C02F 1/281; C02F 1/283; C02F 3/104;
(Continued)

(56) References Cited

U.S. PATENT DOCUMENTS

2007/0259788 A1* 11/2007 Hashman ............... A01N 61/00
504/273

FOREIGN PATENT DOCUMENTS

| CN | 101544446 B1 | * | 9/2009 |
| CN | 104843940 A | * | 8/2015 |
| CN | 206203996 U | * | 5/2017 |

OTHER PUBLICATIONS

Machine-generated English translation of CN 104843940, generated on Apr. 27, 2023.*

(Continued)

Primary Examiner — Fred Prince
(74) Attorney, Agent, or Firm — CBM PATENT CONSULTING, LLC

(57) ABSTRACT

A method for controlling the growth of blue algae in a basin relates to the field of the restoration and protection of the natural ecology on the earth's surface. An ecological water treatment system was constructed for the basin with microorganisms, plants, animals, fillers and the like as main elements by building a novel ecological slope protection at the land-lake ecozone along the banks of the basin and planting eucalyptus in the basin water and/or on the bank of the basin, thereby effectively realizing the efficient nitrogen and phosphorus removal from the basin, controlling the (Continued)

spread of blue algae and improving the environmental water quality.

12 Claims, 5 Drawing Sheets

(51) Int. Cl.
    *C02F 3/34*     (2023.01)
    *C02F 1/28*     (2023.01)
    *C02F 3/10*     (2023.01)
    *C02F 7/00*     (2006.01)
    *C02F 103/00*     (2006.01)
    *C02F 101/20*     (2006.01)
    *C02F 101/30*     (2006.01)

(52) U.S. Cl.
    CPC .............. *C02F 1/283* (2013.01); *C02F 3/104* (2013.01); *C02F 3/32* (2013.01); *C02F 7/00* (2013.01); *C02F 2101/20* (2013.01); *C02F 2101/30* (2013.01); *C02F 2103/007* (2013.01); *C02F 2201/007* (2013.01); *C02F 2303/20* (2013.01); *Y02W 10/10* (2015.05)

(58) Field of Classification Search
    CPC .......... C02F 3/32; C02F 7/00; C02F 2101/20; C02F 2101/30; C02F 2103/007; C02F 2201/007; C02F 2303/20; Y02W 10/10
    USPC ....... 210/602, 615, 616, 617, 631, 903, 906, 210/908, 912, 913, 914
    See application file for complete search history.

(56) References Cited

OTHER PUBLICATIONS

Machine-generated English translation of CN 101544446, generated on Apr. 27, 2023.*
Machine-generated English translation of CN 206203996, generated on Apr. 27, 2023.*

* cited by examiner

METHOD FOR CONTROLLING GROWTH OF BLUE ALGAE IN WATER AREA BY UTILIZING EUCALYPTUS

TECHNICAL FIELD

The invention relates to the field of the restoration and protection of the natural ecology on the surface, in particularly to a method for controlling the growth of blue algae in a water area.

BACKGROUND ART

The outbreak of algae, especially blue algae, caused by eutrophication has become a worldwide problem, which can cause economic loss in aquaculture industry and even ecosystem imbalance, damage ecological landscape of water areas and endanger human health. Therefore, scientists have been making great efforts to look after solutions to this problem.

After research, we found that the outbreak of blue algae is a self-maintenance emergency response of lakes to excessive nutrients, which can be absorbed into blue algae when blue algae erupt. However, after the outbreak period, the nutrients in the dead blue algae are released back to lakes again. Therefore, the problem of blue algae outbreak can not be solved fundamentally only by the way of inhibiting or killing blue algae. Instead, accelerating the biogeochemical cycle of nutrients in lakes is the fundamental solution with long-term effects.

The conventional emergency algae removal processes can be generally divided into three types, namely physical, chemical and biological processes. Among them, the processes usually used comprise adding chemical algaecides, ultrasonic treatment, flocculation treatment, fishing and the like. In addition to the problems such as high cost, difficult to perform, secondary pollution, these processes can only temporarily inhibit the outbreak of blue algae and cannot fundamentally solve the problem of water eutrophication. Therefore, with respect to the protection of water environment, there is still a need to find an eco-friendly and cost-efficient method to control blue algae blooms fundamentally.

SUMMARY OF THE INVENTION

In order to overcome the above-mentioned problems, the inventors have made a great effort and provided a method for controlling the growth of blue algae in a water area. According to this method of the present invention, by building a novel ecological slope protection in a land-lake ecozone along the bank of the basin and planting eucalyptus in the basin water and/or on the bank of the basin, an ecological water treatment system with microorganisms, plants, animals and fillers as main elements can be constructed, thereby allowing nitrogen and phosphorus in the basin water to be removed with high efficiency, the spread of blue algae to be controlled and the the environmental water quality to be improved.

One object of the present invention is to provide a method for controlling the growth of blue algae in a water area, comprising planting trees in the basin water and/or on the banks of the basin.

Preferably, the tree is eucalyptus, and through the roots of eucalyptuses, the pollutants are absorbed or fixed to be removed, thereby inhibiting the growth of blue algae.

In one preferred embodiment, the method further comprises collecting eucalyptus leaves; delivering the eucalyptus leaves or eucalyptus leaf extract into the basin water, wherein the eucalyptus leaf extract is a product after water extraction.

In one preferred embodiment, the method further comprises: building an ecological slope protection 100 in a land-lake ecozone along the bank of the basin, wherein the body of the ecological slope protection 100 extends into the water of the basin, and has a flexible mattress 110 laid on the surface thereof; an ecological filter pool 120 is provided below the flexible mattress 110, and it is isolated from the basin water by sealing the pool body and is contained with a filler layer and a support layer 125 supporting the filler layer; the basin water is introduced into the ecological filter pool 120, and preferably treated by the filler layer to clean up pollutants therein and reduce its eutrophication level; and the treated basin water is discharged from the ecological slope protection 100 via the support layer 125.

The method for controlling the growth of blue algae in a water area according to the present invention has the following beneficial effects:

(1) the surface layer of the ecological slope protection is covered with the flexible mattress composed of multi-layered composite materials, and the interior of the ecological slope protection is the ecological filter pool formed by grading fillers with different particle sizes, so that an ecological water treatment system with microorganisms, plants, animals, fillers and the like as main elements can be constructed;

(2) the ecological sewage treatment system according to the present invention is designed based on the ecological functions of earthworms such as swallowing organics, improving the water permeability of soil, and the synergistic interaction between earthworms and microorganisms, and has good treatment effect on non-point source pollution;

(3) the ecological slope protection according to the present invention can be formed by reconstructing based on the original slope protection, so that the occupation of land resources is greatly reduced;

(4) the modular, large-scale and serialized device system of the ecological slope protection according to the present invention is easy for industrialized production, has low construction and operation costs, and is easy to maintain; and it is convenient to deal with the difference in water quality between the center of the basin and the shore by treating the basin water from different locations through different layers of ecological filter pools respectively, so that all the sewage can reach the standard of higher effluent water quality;

(5) the arrangement of the aeration pipe according to the present invention effectively solves the problem of oxygenation for the sewage in the ecological filter pool, and is beneficial for the survival of aerobic organisms in the sewage, and the removal of organic pollutants, nitrogen and phosphorus;

(6) according to the present invention, eucalyptus is specifically selected as a green tree species in the basin water and/or on the bank of the basin, which can purify the water through its root system, and even can inhibit the growth of algae by allelochemicals produced during its growth without producing secondary pollution;

(7) the regulating pond constructed according to the present invention can regulate the fertilization of blue algae, the retreatment of basin water, and the release of allelochemicals, and it is an effective auxiliary means for the control of blue aglae in the basin water.

DESCRIPTION OF THE REFERENCE SIGNS

Figure 1:
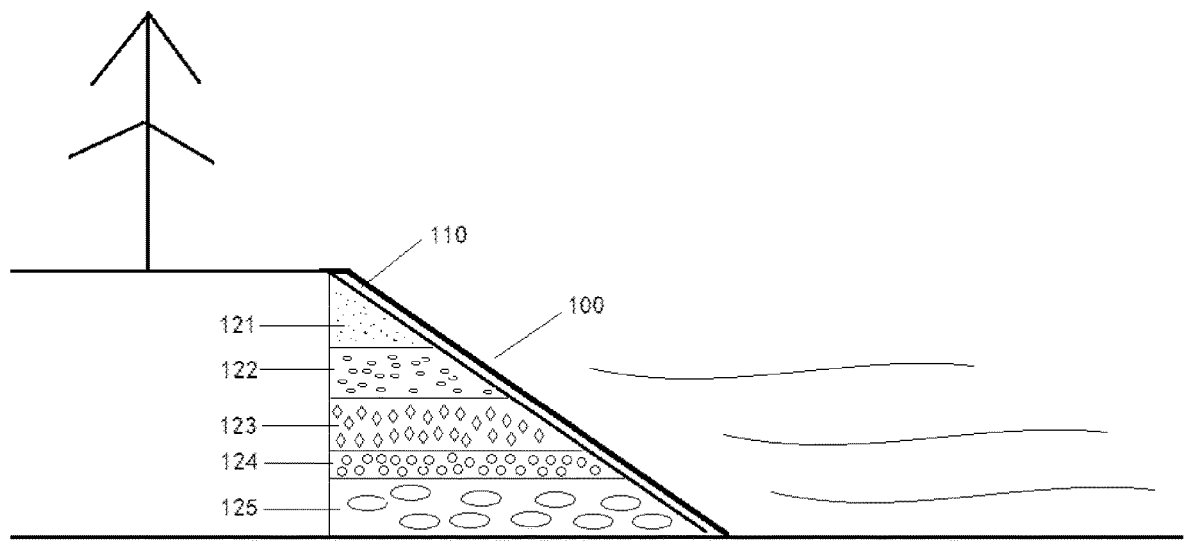
FIG. 1 shows a schematic cross-sectional structure diagram of the ecological slope protection according to one embodiment of the present invention.

100—ecological slope protection
110—flexible mattress
120—ecological filter pool
121—soil layer
122—adjustment layer
123—biological layer
124—ecological layer
125—support layer
130—water distribution pipe
140—aeration pipe
150—drainage pipe
210—fermentation pond
220—sedimentation pond
230—extraction pond

EMBODIMENTS

Hereinafter, the present invention will be further described in detail through the embodiments. Through these descriptions, the characteristics and advantages of the present invention will become clearer.

The term "exemplary" herein means "being considered as an example, an embodiment, or an illustration." Any "exemplary" embodiment described herein should not be construed as being superior or better than other embodiments. Although various aspects of the embodiments are shown in the drawings, unless otherwise noted, the drawings are not necessarily drawn to scale.

Figure 2:
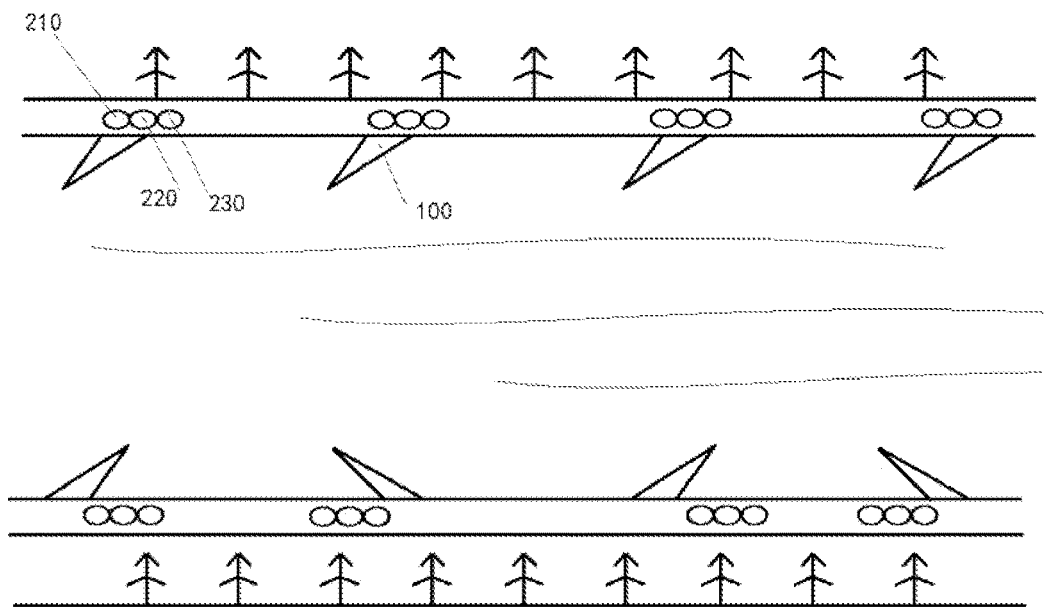
FIG. 2 shows a schematic diagram of the arrangement of basin water-ecological slope protection-eucalyptus according to one embodiment of the present invention.

As shown in FIGS. 1 and 2, one object of the present invention is to provide a method for controlling the growth of blue aglae in a water area, comprising:

building an ecological slope protection 100 in a land-lake ecozone along the bank of a basin, wherein the body of the ecological slope protection 100 extends into the water of the basin, and has a flexible mattress 110 laid on the surface thereof; an ecological filter pool 120 is provided below the flexible mattress 110, and it is isolated from the basin water by sealing the pool body and is contained with a filler layer and a support layer 125 supporting the filler layer; the basin water is introduced into the ecological filter pool 120, and treated by the filler layer to clean up pollutants therein and reduce its eutrophication level; and the treated basin water is discharged from the ecological slope protection 100 via the support layer 125; and planting trees in the basin water and/or on the bank of the basin, wherein through the roots of the tree, the pollutants are absorbed or fixed to be removed, thereby inhibiting the growth of blue algae.

After research, the inventors have found that the methods for controlling algae by plants have good ecological safety and good application prospects. Since plants are large and have a long life, compared with algae, they can store nutrients such as nitrogen and phosphorus much more stably. The more the number and species of plants are in the basin, the stronger the self-purification ability is. However, in China, in the basin where the eutrophication is extremely serious, almost no other kinds of plant exist except for algae. Therefore, it is necessary to reconstruct the basin plant system through artificial means.

In one preferred embodiment of the present invention, the trees planted in the basin water and/or on the bank of the basin are preferably eucalyptuses.

Although other aquatic plants and trees also can remove nitrogen and phosphorus, after a lot of experiments and researches, the inventors found that eucalyptus is the preferred tree species, which has the following characteristics:

(i) During the growth of eucalyptus, exclusive secondary metabolites, namely allelochemicals, are produced. There are many types of allelochemicals (water-soluble allelochemicals isolated from eucalyptus, such as ferulic acid, coumaric acid, coffee Acid, megacineol, gallic acid, quaternary acid, chlorogenic acid and other phenolic compounds, volatile allelochemicals isolated from eucalyptus, such as pinene, allene, phenanthrene and cineole, etc.). Due to the synergistic effect of multiple allelochemicals, the algae inhabitation specificity of eucalyptus is better than that of barley straw, foxtail grass, bitter grass and other plants with allelochemicals. Moreover, eucalyptus can effectively inhibit the growth of algae without secondary pollution;

(ii) Eucalyptus grows fast, and its demand for nutrients (nitrogen and phosphorus) is significantly greater than that of other plants, which can fundamentally accelerate the biogeochemical cycle of nutrients in the basin and restrain the conditions for the outbreak of blue algae;

(iii) Eucalyptus grows fast, but lives shorter than other tree species, which is contributed to remove nutrients out of the water body. Additionally, since eucalyptus has good wood and is often used for papermaking, it has a large social demand and high economic benefits.

Based on the above three characteristics, eucalyptus is planted on the bank or in the water of the eutrophic basin where blooms occur, and in case of planting in the basin water, part of eucalyptus is above the water surface (to contact the air), and the other part of eucalyptus is below the water surface.

In one preferred embodiment, eucalyptus leaves are collected, and then the eucalyptus leaves or eucalyptus leaf extracts are delivered into the basin water, wherein the eucalyptus leaf extract is the product after water extraction, and the extraction methods include ultrasonic extraction and fermentation extraction.

In the present invention, the species of eucalyptus is not limited, and for example, it can be *Eucalyptus grandis*, Eucalyptus Congo No. 12, and *Eucalyptus grandis* x *urophylla* and other varieties.

According to the present invention, a plurality of the ecological slope protections 100 separated at a predetermined interval are arranged along the basin water, forming an ecological slope protection group. The flexible mattress 110 laid on the surface of the ecological slope protection 100 is woven from multilayer polymer fibers, and has pores with larger constant size of preferably 0.05 to 1 cm, more preferably 0.1 to 0.5 cm. The pores with this size can intercept silt in the water, which can bond into blocks in the gaps between the fibers, thereby providing a favorable condition for plants to take root. The plants not only play a role of landscaping, but also create a suitable growth environment for fishs, shrimps and molluscs, thereby forming a biosphere with the plant-animal-microbial food chain, rebuilding the original ecology and guaranteeing the biodiversity. The plants are aquatic plants, including but not limited to phalaris arundinacea, alfalfa, ryegrass, dactulis glomerata, vetiver grass and the like.

Furthermore, according to the present invention, the flexible mattress 110 can be made of one or more of non-woven fabrics, geotextiles, eco-bags, etc., which are woven from multilayer existing polymer fibers. Compared with traditional hard slope protection, the slope protection according to the present invention greatly reduces the consumption of resources such as stones.

As shown in FIG. 1, according to the present invention, the filler layer of the ecological filter pool 120 is laminated by four functional layers from top to bottom as follows:

the first layer, which is a soil layer 121 for allowing the growth of aquatic plants, absorbing heavy metals, degrading organics and removing nitrogen and phosphorus;

the second layer, which is an adjustment layer 122 for supporting the soil layer 121, adsorbing and fixing the heavy metals, nitrogen, phosphorus and the organic materials;

the third layer, which is a biological layer 123 for adsorbing and fixing the heavy metals, degrading the organics and removing nitrogen and phosphorus;

the fourth layer, which is an ecological layer 124 for filtering water and intercepting the soil to avoid soil loss and block the water outlet pipelines.

According to the present invention, the soil layer 121 is laid as the first layer, and has a thickness of 30 to 50 cm to allow the rooting and growing of aquatic plants.

In one preferred embodiment, carbon is added into the soil layer 121, and then earthworms are stocked in the soil layer 121 to convert the soil layer 121 into an earthworm bed. The stocking density of earthworms is 8 to 12 g (earthworms)/L (filler). The carbon added includes but is not limited to wood chips, mushroom bran, straw, etc.

In one preferred embodiment, the earthworms are selected from Taihu red earthworms or *Pheretima guillelmi*, and the improved novel earthworm species have significantly improved flooding resistance and are more resistant to soiling.

By introducing the earthworms and the microorganisms in the soil layer and introducing the microorganisms in the biological layer 123, the ecological filter pool 120 can fully take advantage of the synergistic interaction between earthworms and microorganisms, and the functions of earthworms such as increasing the air and water permeability and swallowing organics, so that the sewage treatment can be performed much better and effectively. The earthworms can degrade the organics in the ecological filter pool 120, and additionally can promote the conversion and the mineralization of C, N, P through the grinding in their gizzard, the biochemical effect of their intestine and the synergistic interaction between earthworms and microorganisms. However, the main effects of earthworms are mechanical loosening and digesting in the soil layer, which are contributed to the physical cleaning of the filter bed and thus prevent soil hardening and blocking. The behaviors of earthworms in the filter pool can also effectively increase the amount and the activity of microorganisms, and thus promote the degradation and the conversion of organics.

According to the present invention, the adjustment layer 122 is laid as the second layer, which is formed by mixing the natural zeolite, limestone and activated carbon as a ratio of 1:1:1, and has a thickness of 20 to 30 cm.

The natural zeolite, limestone and activated carbon each have adsorption capacity due to their porous structures. Among them, especially the adsorption capacity of activated carbon is extremely strong, the adsorption capacity of the natural zeolite to heavy metals, ammonia nitrogen and organics is much better due to its molecule structure, and the limestone has an effective regulating effect on the acidity and alkalinity of water, which is beneficial to the growth of earthworms in the upper layer and the activity of microorganisms in the third biological layer 123. When the amount of natural zeolite is increased, the amounts of activated carbon and limestone are correspondingly reduced, so that the adsorption capacity to pollutants is reduced. When the amount of activated carbon is increased, the amounts of natural zeolite and limestone are correspondingly reduced, so that the supporting effect on the soil layer 121 and the regulating capacity to pH of water are reduced, although the adsorption capacity is improved. When the amount of limestone is increased, the amounts of natural zeolite and activated carbon are correspondingly reduced, the regulating capability to pH of water is improved, but the adsorption capability is reduced.

The natural zeolite, limestone and activated carbon in the adjustment layer 122 each individually have a particle size of 0.2 to 2.0 cm. The ecological filter pool 120 operates under the synergistic interaction of physics, chemistry and biology to effectively reduce or eliminate pollutants in the leachate, and the moderate dissolved oxygen is beneficial to the physical, chemical and biological reactions. The particle size of the fillers in the adjustment layer 122 is selected based on the coordination of gas flowing and adsorption of pollutants, so that poor gas flowing caused by the dense packing of fillers can be avoided, and at the same time, good adsorption capacity can be achieved.

According to the present invention, the biological layer 123 is laid as the third layer, and the filler in this layer is bacteria-loaded activated carbon, i.e. so-called biological activated carbon. This layer 123 has a thickness of 20 to 40 cm.

The bacteria loaded include nitrifying bacteria (nitrite bacteria and nitrate bacteria) and phosphorus-accumulating bacteria, which can be fixed on biochar by a carrier combination method (such as that disclosed in Chen Zhaohui, Zhang Han, et al. *Foul smell elimination and fertilizer efficiency enhancement of composting by immobilizing bacterial on biochar*[J]. Science Technology and Engineering, 2013, 13(32): 9592-9597+9618). Therefore, the efficiency of nitrogen and phosphorus removal can be improved by biochar adsorption in combination with microorganism metabolism.

The phosphorus accumulating bacteria can synthesize polyphosphate and accumulate the synthesized polyphosphate in cells under aerobic condition, and release phosphorus again under anaerobic condition. The phosphorus accumulating amount under aerobic condition is larger than the phosphorus releasing amount under anaerobic condition. Therefore, the phosphorus content in the percolate can be effectively controlled by adding the phosphorus accumulating bacteria. Since the nitrifying bacteria can oxidize ammonia nitrogen into nitrite and nitrate, and the denitrifying bacteria can perform denitrification with organics and nitrate, the removal of nitrogen can be realized by the combination of both of them.

The biological activated carbon has a particle size of 0.10 to 0.80 cm, which is contributed to realize the coexistence of aerobic environment and anaerobic environment and the functions of microorganisms.

According to the present invention, the ecological layer 124 is laid as the fourth layer, and the fillers in this layer 124 are one or more of waste materials such as fine sand, broken stone, steel slag, coal slag, construction waste, waste gypsum. The thickness of the ecological layer 124 is 20 to 40 cm, and the particle size of the filler is 0.1 to 5.0 cm.

The waste materials are idle in life and difficult to dispose, however, by using those materials in ecological construction, the utilization value of them can be improved, and the construction cost of the ecological slope protection 100 can be reduced. When the ecological layer 124 is filled with materials having adsorption properties, such as fine sand, crushed stone, coal slag, construction waste and waste gypsum, in addition to a filtering function, this layer 124 will also have a function of adsorbing heavy metals and organics.

According to the present invention, the support layer 125 is provided below the filler layer to support the filler thereon. The filler is cobblestones, and has a particle size of 5.0 to 10.0 cm. The thickness of the support layer 125 is 10 to 15 cm.

Cobblestone is weathered rock, which has a porous structure and adsorption performance, so it can achieve adsorption and fixation of heavy metals and organics. At the same time, its lager size is contributed to discharge the water treated by four layers fillers through the drainage pipe 150 at the bottom of the ecological slope protection 100.

Figure 3:
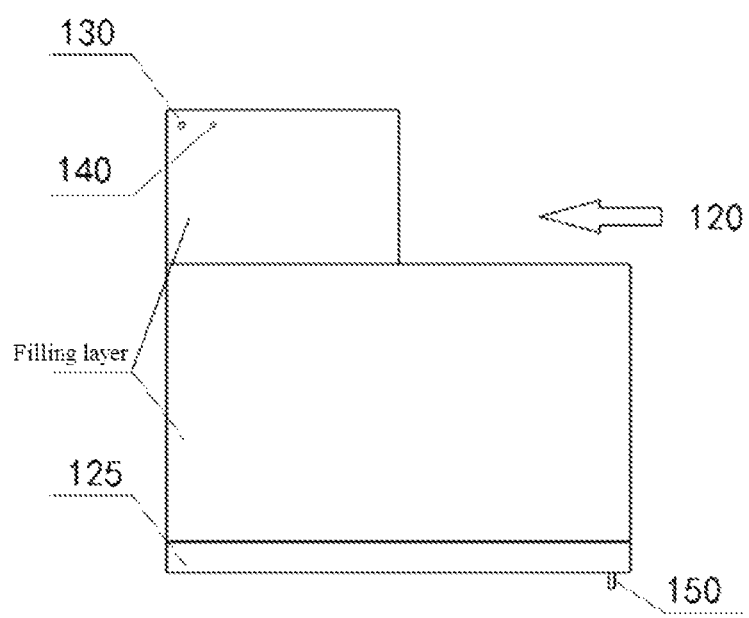
FIG. 3 shows a schematic structure diagram of the modular ecological filter pool according to one embodiment of the present invention.
Figure 4:
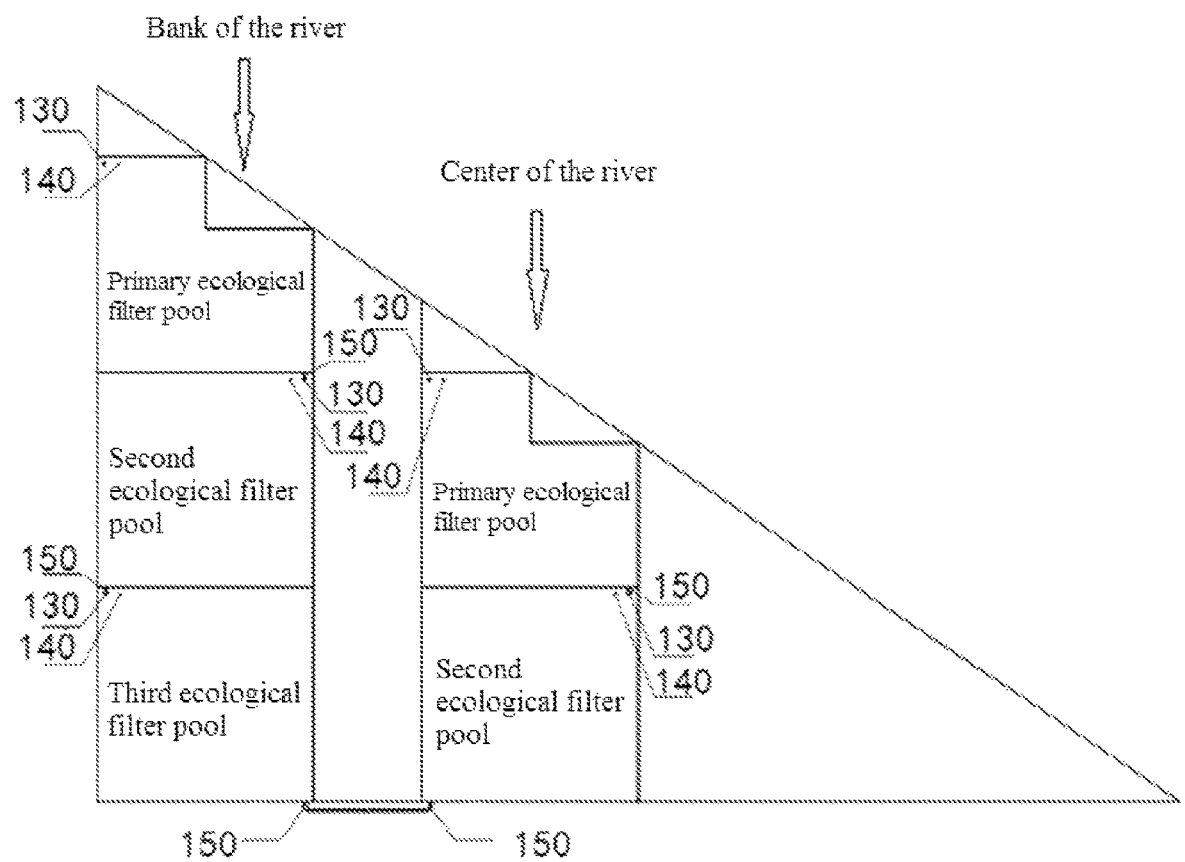
FIG. 4 shows a schematic structure diagram of the modular ecological slope protection according to one embodiment of the present invention.

As shown in FIGS. 3 and 4, according to the present invention, the basin water is introduced into the ecological slope protection 100 through the water distribution pipes 130 by means of a water pump. The water distribution pipe 130 is disposed in the surface layer (outside of the soil layer 121) and the soil layer 121 of the ecological slope protection 100, respectively, and it is made of PVC with 0.1 to 0.5 cm drain holes distributed thereon to allow water penetrating into the novel ecological slope protection 100. The water distribution pipe 130 is wrapped by bluestones with geotextile on its periphery and the geotextile is surrounded by soil. By using the geotextile for filtering and using the bluestones for supporting, the possibility of blocking the drain holes by the wet fillers can be avoided.

In one preferred embodiment, an aeration pipe 140 is arranged beside the water distribution pipe 130 installed above the soil layer 121, and is connected with an external fan for aerating. By using the aeration pipe 140, the problem of oxygenation for sewage under the ecological slope protection 100 can be effectively solved. Furthermore, the arrangement of aeration pipe is benificial for the survival of plant-earthworm-aerobic microorganisms, the removal of organic pollutants (mainly BOD) in the sewage, the nitrification of nitrogen-containing substances, and the dephosphorization of phosphorus-containing substances.

Furthermore, the aeration pipe 140 and the water distribution pipe 130 are each individually wrapped by bluestones with geotextile.

The aeration pipe 140 can also be a PVC pipe with 0.05 to 0.2 cm drainage holes distributed thereon.

According to the present invention, the sheets with good sealing, water leak proof and water impermeability characteristics (namely water-proof sheets) are utilized to isolate the ecological slope protection 100 from the external basin water.

As shown in FIG. 4, in one preferred embodiment according to the present invention, the ecological slope protection 100 has a modular structure. Particularly, the body of the ecological filter pool 120 is made of the water-proof sheets, so that it can be assembled and disposed on site of water treatment and then be loaded with fillers in order, and each body can individually construct one ecological filter pool 120. Each ecological slope protection 100 may include one or more ecological filter pool(s) 120, and preferably, each ecological slope protection 100 includes at least two ecological filter pools 120.

For some water bodies, the flow velocity of their lower part is higher than that of their upper part, and the sediment in the lower part is rich and coarse. If the ecological filter pools 120 constructing the ecological slope protection 100 are compactly arranged, the flow of the lower part of water may be significantly obstructed. As a result, the exchange of water on both sides of the ecological slope protection 100 may be affected and the strength of impact on the ecological slope protection 100 may be increased. Therefore, a plurality of the ecological filter pools 120 are stacked in layers and columns, the ecological filter pools 120 on each column are aligned, and the adjacent ecological filter pools 120 on each layer are separated at a predetermined interval, for example, 5 to 10 cm.

In one preferred embodiment, in order to facilitate the laying and fixing of the flexible mattress 110, the ecological filter pool 120 on the top layer is designed to be terraced, so that heavy objects can be placed at the terraced portion to press and fix the flexible mattress 110.

In one preferred embodiment, for the ecological filter pools 120 on the same column, the drainage pipes of the ecological filter pools 120 on the upper layer are connected with the water distribution pipes 130 of those on the lower layer to discharge the sewage treated by the upper layer into the soil layer 121; and the aeration pipes 140 of the ecological filter pools 120 on the upper layer are connected with the aeration pipes 140 of those on the lower layer. Preferably, the aeration pipe 140 of the ecological filter pool 120 on the lower layer has a larger aperture than that of the ecological filter pool 120 on the upper layer, which facilitates the gas transmission.

According to the present invention, the novel ecological slope protection 100 has a modular structure. The drainage pipe 150 at the bottom of the ecological filter pool 120 can be connected with the water distribution pipe 130 to realize multi-level unit series connection. All of the parts, such as the biological filter pool body, the water distribution pipe 130, the aeration pipe 140, and the drainage pipe 150, can be prefabricated, connected and assembled on site, and then buried under the slope, which are easy to install so as to greatly improve the construction speed, and furthermore, realize the equipmentization of sewage treatment facilities so as to facilitate the industrial production, the post-maintenance and the replacement of fillers.

In one preferred embodiment, a metal wire cage is sheathed on the periphery of each ecological filter pool 120 to increase the force points applied to the ecological filter pool 120. By applying force to the metal wire cage, the ecological filter pool 120 can be subjected to the operations such as replacement.

In one preferred embodiment, since the water quality in the center of the basin is generally better than that close to the bank, the water close to the bank will be treated by more layers of the ecological filter pools 120 compared to the water in the center of the basin. For example, the water close to the bank is treated by three layers of the ecological filter pools 120, and the water in the center of the basin is treated by two layers of the ecological filter pools 120.

Therefore, the height of the ecological slope protection 100 is gradually reduced from the bank towards the waters of basin. In this way, the water from the center of the basin and the water close to the bank can be separately delivered into the ecological filter pools 120 with different heights to be treated.

In view of the difference in water quality between the center of the basin and the bank, by treating the basin water from different locations through different layers of ecological filter pools 120 respectively, all the basin water can reach the standard of higher effluent water quality.

After a period of water treatment operation, the performance of the ecological filter pools 120 is restored. The restoration method includes: taking out the first layer of the ecological filter pool 120 on the top in the ecological slope protection 100, raising the second layer of the ecological filter pool 120 up to the location on the top, and disposing the new ecological filter pool 120 reloaded with the fillers to the location where the original second layer of the ecological filter pool 120 lies. Since the ecological filter pools 120 below the second layer are used to treat the water with better quality compared with upper layers, they can be directly replaced with new ecological filter pools 120 after much longer water treatment operation.

In one preferred embodiment, the ecological slope protection 100 is an upright slope protection, and the direction in which the ecological slope protection 100 extends into water is approximately perpendicular to the shoreline, that is, the angle $\alpha$ with the shoreline is $85° \leq \alpha \leq 95°$. Alternatively, the ecological slope protection 100 is an upward-lifting slope protection, and in the direction of water flow, the angle $\alpha$ between the direction in which the ecological slope protection 100 extends into water and the shoreline is $95° < \alpha < 175°$; or the ecological slope protection 100 is a downward-lifting slope protection, in the direction of water flow, the angle $\alpha$ between the direction in which the ecological slope protection 100 extends into water and the shoreline is $5° < \alpha < 85°$. In areas with slow water flow, the angle between the ecological slope protection 100 and the shoreline can be within any range; in areas with fast water flow, the extension direction is designed according to the specific environment to achieve the energy and wave dissipation.

In a further preferred embodiment, in a lake or a basin with slower flow, the upright slope protection and the downward-lifting slope protection are arranged in sequence, and a convergence port is formed at the location where the two slope protections 100 are opposite to each other. Due to the existence of the convergence port, when the waves or the water flow carrying suspended load such as sediment and phytoplankton such as green algae rush to the ecological slope protection 100, the sediment and phytoplankton can enter in the area enclosed by the two ecological slope protections 100 through the convergence port and stay in it. The semi-open feature of the convergent port allows the sediment and phytoplankton to influx continuously and then deposite or stay on the edge of the shoreline but not to totally leave easily, reducing the shielding of phytoplankton in the external water body to the water surface. Moreover, the Sedimentation and siltation of suspended load such as sediment are contributed to the growth of non-phytoplankton aquatic plants on the shoreline, can induce and drive the recovery of non-phytoplankton aquatic plants, inhibit the growth of phytoplankton and promote the purification process such as the removal of nitrogen and phosphorus on the vegetation-type shoreline.

In one preferred embodiment of the present invention, a regulating pond is built on the bank close to the ecological slope protections 100. The basin water is introduced into the regulating pond to be treated, and then the supernatant obtained is delivered into the ecological slope protections 100.

The regulating pond includes a fermentation pond 210, a sedimentation pond 220 and an extraction pond 230. The basin water is introduced into the fermentation pond 210. The blue algae picked up from the basin is subjected to the fermentation in the fermentation pond 210, and the fermented broth obtained can be used as organic fertilizer to feed the eucalyptus on the bank. A grille or a filter screen is provided at the water inlet of the sedimentation pool 220 to remove floating matter, suspended matter and aquatic organisms from the basin water introduced. Then, the supernatant after sedimentation is delivered to each ecological filter pool 120 on the upper layer. The basin water and the collected eucalyptus leaves are put into the extraction pond 230 to prepare the eucalyptus leaf extract, and then the obtained eucalyptus leaf extract can be directly delivered to the basin.

It can be seen from the above that the regulating pond is a multifunctional pond, and any one of the functional units can be operated separately, for example, only the sedimentation pond 220 is operated to perform the sedimentation treatment of the basin water.

The regulating pond built according to the present invention can implement the regulation on the fertilization of blue aglae, the retreatment of basin water, and the release of allelochemicals, and is an effective auxiliary means for controlling the blue aglae in the basin water.

Another object of the present invention is to provide a system for controlling the growth of blue algae in a water area, comprising: an ecological slope protection 100 built at the land-lake ecozone along the bank of the basin and a regulating pond built on the bank close to the ecological slope protection 100, wherein, the body of the ecological slope protection 100 extends into the water of the basin, and has a flexible mattress 110 laid on the surface thereof; an ecological filter pool 120 is provided below the flexible mattress 110, and it is isolated from the basin water by sealing the pool body and is contained with a filler layer and a support layer 125 supporting the filler layer; the basin water is introduced into the ecological filter pool 120, and preferably treated by the filler layer to clean up pollutants therein and reduce its eutrophication level; and the treated basin water is discharged from the ecological slope protection 100 via the support layer 125;

the basin water is introduced into the regulating pond, and after treated, the obtained supernatant is delivered to the ecological slope protection 100.

In one preferred embodiment, the filling layer of the ecological filter pool 120 is laminated by four functional layers from top to bottom as follows:

the first layer, which is a soil layer 121 for allowing the growth of aquatic plants, absorbing heavy metals, degrading organics and removing nitrogen and phosphorus, and preferably having a thickness of 35 to 50 cm;

the second layer, which is an adjustment layer 122 composed of natural zeolite, limestone and activated carbon mixed at a ration of 1:1:1 with a particle size of 0.2 to 2.0 cm for supporting the soil layer 121, adsorbing and fixing heavy metals, nitrogen, phosphorus and organics, and having a thickness of 20 to 30 cm;

the third layer, which is a biological layer 123 filled with bacteria-loaded activated carbon (i.e. biological activated carbon) with a particle size of 0.10 to 0.80 cm for adsorbing and fixing heavy metals, degrading organics and removing nitrogen and phosphorus, and having a thickness of 20 to 40 cm;

the fourth layer, which is an ecological layer 124 filled with one or more of waste materials such as fine sand, gravel, steel slag, cinder, construction waste and waste gypsum with a particle size of 0.1 to 5.0 cm for filtering water and intercepting soil to avoid soil loss, and having a thickness of 20 to 40 cm.

In a further preferred embodiment, carbon is added into the soil layer 121, and then earthworms are stocked in the soil layer 121 to convert the soil layer 121 into an earthworm bed. The stocking density of earthworms is 8 to 12 g (earthworms)/L (filler).

In a further preferred embodiment, the basin water is introduced into the ecological slope protection 100 through a water distribution pipe 130 by means of a water pump, and the water distribution pipe 130 is disposed in the surface layer and the solid layer of the ecological slope protection 100 and is made of PVC with 0.1 to 0.5 cm drain holes distributed thereon.

An aeration pipe 140 is arranged beside the water distribution pipe 130 disposed in the soil layer 121, and is connected with an external fan to aerate. The aeration pipe 140 is a PVC pipe with 0.05 to 0.2 cm air vents distributed thereon.

The aeration pipe 140 and the water distribution pipe 130 are each individually wrapped by bluestones with geotextile, and the geotextile is surrounded by soil.

In a further preferred embodiment, the ecological slope protection 100 has a modular structure, and one pool can form one ecological filter pool correspondingly. Each ecological slope protection 100 may include one or more ecological filter pool(s) 120, preferably at least two ecological filter pools 120. In case of a plurality of ecological filter pools 120 included, they are stacked in layers and columns, the ecological filter pools 120 on each column are aligned, and the adjacent ecological filter pools 120 on each layer are separated at a predetermined interval.

Preferably, for the ecological filter pools 120 on the same column, the drainage pipe of the ecological filter pool 120 on the upper layer is connected with the water distribution pipe 130 of the pool 120 on the lower layer, to discharge the basin water treated by the ecological filter pool 120 on the upper layer into the soil layer 121; the aeration pipe 140 of the ecological filter pool 120 on the upper layer is connected with the aeration pipe 140 of the pool 120 on the lower layer, to allow air passing through the ecological filter pool 120 on the upper layer and entering the soil layer 121; preferably, the diameter of the aeration pipe 140 of the ecological filter pool 120 on the lower layer is larger than that of the aeration pipe 140 of the pool 120 on the upper layer, which facilitates the gas transmission.

In a further preferred embodiment, a metal wire cage is sheathed on the periphery of each ecological filter pool 120.

In a further preferred embodiment, the height of the ecological slope protection 100 is gradually reduced from the bank towards the waters of basin. In this way, the water from the center of the basin and the water close to the bank can be separately delivered into the ecological filter pools 120 with different heights to be treated.

In a further preferred embodiment, in a lake or a basin with slower flow, the upright slope protection and the downward-lifting slope protection are arranged in sequence, and a convergence port is formed at the location where the two slope protections are opposite to each other.

In one preferred embodiment, the regulating pond includes a fermentation pond 210, a sedimentation pond 220 and an extraction pond 230. The basin water is introduced into the fermentation pond 210. The blue algae picked up from the basin is subjected to the fermentation in the fermentation pond 210, and the fermented broth obtained can be used as organic fertilizer to feed the eucalyptuses on the bank. A grille or a filter screen is provided at the water inlet of the sedimentation pool 220 to remove floating matter, suspended matter and aquatic organisms from the basin water introduced. Then, the supernatant after sedimentation is delivered to each ecological filter pool 120 on the upper layer. The basin water and the collected eucalyptus leaves are put into the extraction pond 230 to prepare the eucalyptus leaf extract, and then the obtained eucalyptus leaf extract can be directly delivered to the basin.

EXAMPLES

Based on the river flow of 3000 $m^3/d$ and the hydraulic load of 0.5 $m^3/(m^2 \cdot d)$, as shown in FIGS. 1 and 2, a total sum of 10 novel ecological slope protections were constructed by renovating alternately along the river banks, and each novel ecological slope protection handled 6 $m^3$ of the basin water per day. Furthermore, the eucalyptus zones were formed along both sides of the river.

As shown in FIG. 4, each novel ecological slope protection 100 consisted of two primary ecological filter pools (on the top layer), two secondary ecological filter pools (on the middle layer), and a third ecological filter pool (on the bottom layer), which were arranged in two columns and three rows. The primary ecological filter pool was irregularly terraced, and had a floor size of 2 m*1.5 m, a total height of 1.5 m, a step height of 1 m, a step depth of 0.75 m. The secondary/third ecological filter pool was a container with the shell size of 2 m*1.5 m*1.5 m. The river water close to the bank passed through the first row of ecological filter pool, and the river water in the center of the river passed through the second row of ecological filter pool. The ecological filter pool 120 was made of glass fiber reinforced plastics with good sealing, water leak proof and water impermeability characteristics, and was built by installing on-site. A metal wire cage was sheathed on the periphery of each ecological filter pool.

The intermittent water intake was implemented for 6 hours a day. The drainage pipe 150 was arranged at the bottom of each ecological filter pool, and cooperated with the water distribution pipe 130 having the same diameter. At the bottom of the whole ecological slope protection, two drainage pipes were converged into a large outlet pipe to drain into the river. The aeration pipes are arranged beside the water distribution pipes.

The flexible mattress 110 made by splicing the non-woven fabrics was covered on the surface of the ecological slope protection 100, and had a pore size of 0.05 to 1 cm. Under the flexible mattress, the ecological filter pools 120 were provided. Each ecological filter pool contained a 35-45 cm thick earthworm bed, a 20-30 cm thick adjustment layer 122 (composed of natural impurities, limestone and activated carbon with the mixing ratio of 1:1:1 and the particle size of 0.2 to 2.0 cm), a 20-40 cm thick biological layer 123 (biological activated carbon loaded with nitrous bacteria, nitrate bacteria and phosphorous accumulating bacteria, having a particle size of 0.10 to 0.80 cm), a 20-40 cm thick ecological layer 124 (fine sand, gravel, cinder, having a particle size of 0.1 to 5.0 cm), and a 10-15 cm thick supporting layer 125 composed of cobblestones (having a particle size of 5.0 to 10.0 cm). Taihu red earthworms were stocked in the earthworm bed with a stocking density of 10 g (earthworms)/L (filler), and the earthworm bed was the active area for the earthworms.

The drain pipe 150 was arranged at the bottom of each filter pool, and the drain pipe 150 was seamlessly connected with the water distribution pipe 130. The aeration pipe 140 was arranged beside the water distribution pipe 130, to sufficiently supply the oxygen required for the decomposition of organics during the dropping of the river water. The water distribution pipe 130 was disposed in the surface layer and the soil layer 121 of the ecological slope protection 100. The water distribution pipe 130 was a PVC pipe with 0.1 to 0.5 cm drain holes distributed thereon, and was wrapped by bluestones with geotextile on its periphery to allow water infiltrate into the novel ecological slope protection 100.

A regulating pond was built on the bank close to the ecological slope protection 100. The regulating pond included a fermentation pond 210, a sedimentation pond 220 and an extraction pond 230. The river water was introduced into the fermentation pond 210. The blue algae picked up from the river were subjected to the fermentation in the fermentation pond 210, and the fermented broth obtained was used as organic fertilizer to feed the eucalyptuses on the bank. A grille or a filter screen was provided at the water inlet of the sedimentation pool 220 to remove floating matter, suspended matter and aquatic organisms from the basin water introduced. Then, the supernatant after sedimentation was delivered to each ecological filter pool 120 on the upper layer. The river water and the collected eucalyptus leaves were put into the extraction pond 230 to prepare the eucalyptus leaf extract, and then the obtained eucalyptus leaf extract was directly delivered to the river.

After the ecological slope protection was built and operated for 9 months (only the sedimentation pond of the regulating pond was utilized), in winter (March of the following year), the overflowing water near the ecological slope protection was detected for several times. As the results showed, based on 10 ecological slope protections, the average removal rates of major pollutants in the overflowing water were as follows: 70% of the suspended particulates, 65% of the chemical oxygen demand, 59% of the five-day biochemical oxygen demand, 65.7% of the total phosphorus, 69.1% of the ammonia nitrogen, and 52.2% of nitrite nitrogen; and the dissolved oxygen was increased by 25%.

EXPERIMENTAL EXAMPLES

Experimental Example 1

The eucalyptus extract was prepared as follows:
(1) cutting the eucalyptus leaves into small pieces;
(2) drying the eucalyptus leaves in an oven at 40° C. to a constant weight;
(3) crushing the dried eucalyptus leaves with a pulverizer until the diameter of the powder was less than 200 mesh;
(4) putting the powder into water at a ratio of 1 g/40 mL for extraction;
(5) ultrasonic dispersing for 30 min every 24 hours for a total period of 7 days;
(6) filtering with gauze to obtain the eucalyptus leaf extract.

The performance of the eucalyptus extract to inhibit algae was detected as described below. 100 mL BG-11 medium and 1 mL logarithmic growth phase blue algae were added into a 250 mL Erlenmeyer flask. After the added blue algae acclimatizated in the new culture medium for two days, 0.4 mL of 25 g/L extract was then added thereto to make the concentration of the extract in the algae solution reach 100 mg (dry weight of leaves)/(L). The density and the inhibition rate of blue aglae on days 1, 2, 3, 4 and 5 of the experiment were then determined, and the results were shown in FIG. 5. Additionally, 0.8 mL of 25 g/L extract was added thereto to make the concentration of the extract in the algae solution reach 200 mg (dry weight of leaves)/(L). The density and the inhibition rate of blue aglae on days 1, 2, 3, 4 and 5 of the experiment were then determined, and the results were shown in FIG. 6.

Figure 5:
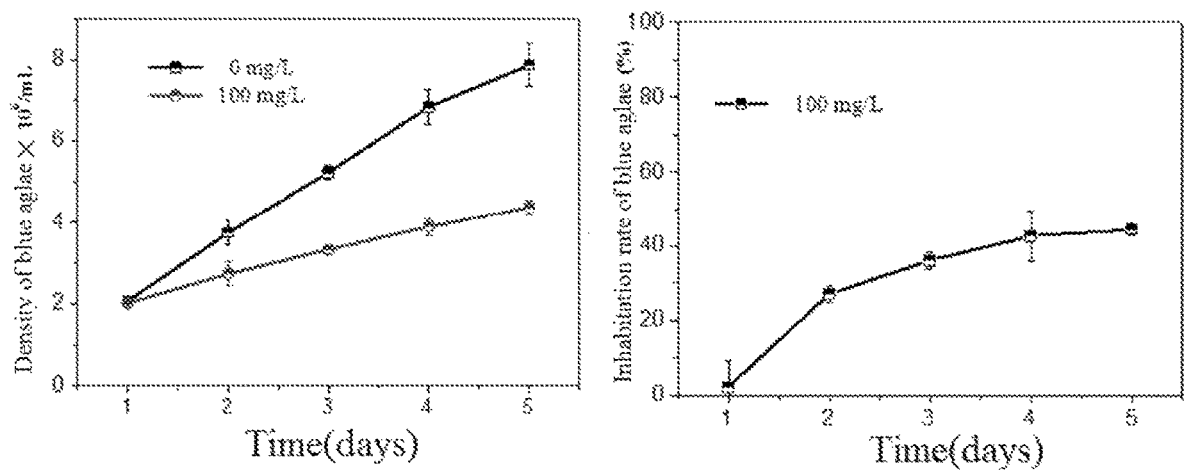
FIG. 5 shows the results of blue algae density and inhibition rate when the concentration of the extract added in the algae solution reaches 100 mg (dry weight of leaves)/(L algae solution) in Example 1.
Figure 6:
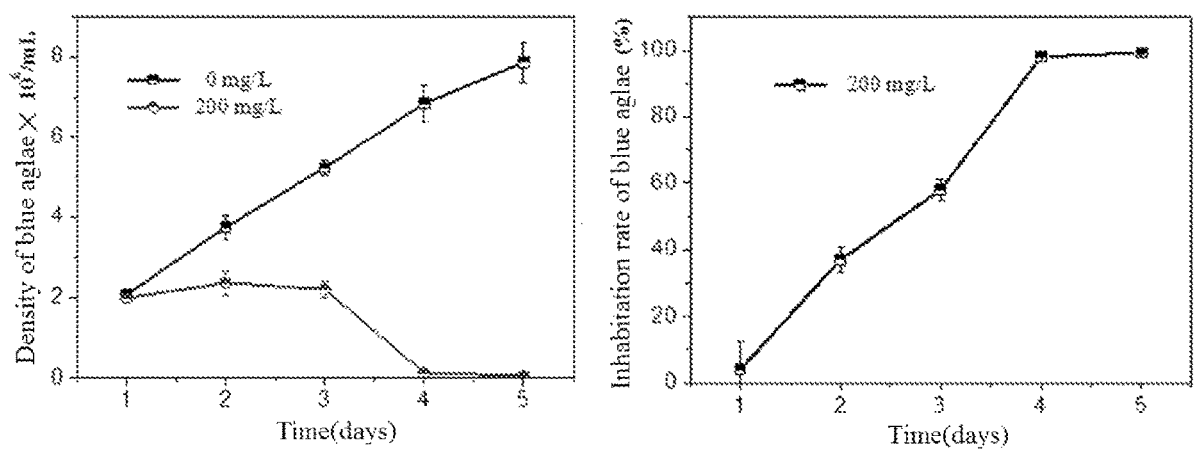
FIG. 6 shows the results of blue algae density and inhibition rate when the concentration of the extract added in the algae solution reaches 200 mg (dry weight of leaves)/(L algae solution) in Example 1.

It can be seen from FIGS. 5 and 6 that the eucalyptus leaf extract has a strong inhibitory effect on blue aglae, and the inhibition rate is related to the dosage of the eucalyptus leaf extract. When the dosage was 100 mg/L, the algae inhibition rate can reach 40% on the 5th day of the experiment. When the dosage was 200 mg/L, the algae inhibition rate can be more than 95% on the 4th day of the experiment.

Experimental Example 2

Eucalyptus seedlings (Guangan No. 29) were purchased from Guangxi Province of China, and the seedlings were about 30 cm long. The same two experiment devices containing 4 L of BG11 culture medium were prepared, and then blue aglae was added into one device, and both blue aglae and eucalyptus were added into the other device, respectively. From the beginning of the experiment, the density of blue aglae, soluble organic phosphorus SPR (ultraviolet spectrophotometry), and nitrate nitrogen $NO_3^-N$ (ultraviolet spectrophotometry) after 1, 3, 6, 9 and 12 days of culture were monitored. The experiment results were shown in FIG. 7.

Figure 7:
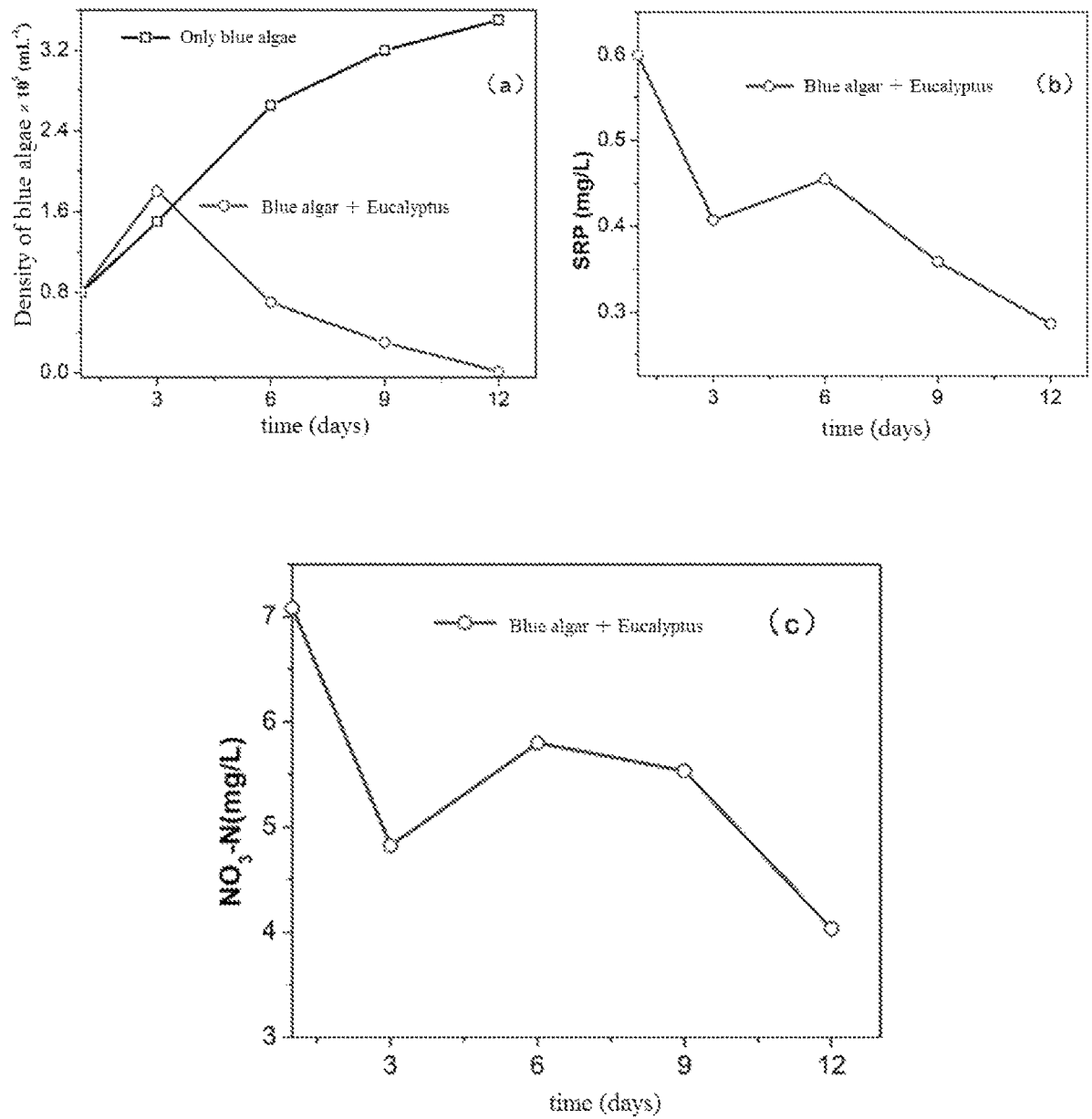
FIG. 7 shows the results of changes in blue algae density, soluble organic phosphorus SPR, and nitrate nitrogen $NO_3^-N$ during the co-cultivation of blue algae and eucalyptus seedlings in Experimental Example 2.

It can be seen from FIG. 7 that eucalyptus seedlings can secrete allelochemicals that inhibit the growth of cyanobacteria and can quickly absorb nutrients such as nitrogen and phosphorus in water. From the third day, the density of blue aglae in the blue aglae+eucalyptus seedling sample decreased rapidly until it was below the detection limit. It shows that eucalyptus seedlings can secrete allelochemicals that inhibit the growth of blue aglae during the growth process, leading to a large number of blue aglae death. The concentrations of nitrogen and phosphorus in the water of blue aglae+eucalyptus seedling sample were tended to decrease with the progress of the experiment. 1.26 mg phosphorus and 12.24 mg nitrogen were reduced within 12 days. It shows that eucalyptus also absorbs nutrients such as nitrogen and phosphorus into the body for growth and purifies the water.

The present invention has been described in detail in combination with embodiments and examples. However, it should be noted that these are merely illustrative for the present invention and do not constitute any limitation to the scope of the present invention. Within the spirit and the scope of the present invention, it can be understood by those skilled in the art that various improvements, equivalent substitutions or modifications can be made to the technical content of the present invention and its embodiments, all of which fall in the scope of the present invention.

What is claimed is:

1. A method for controlling growth of blue algae in a basin, comprising planting trees in basin water and/or on banks of the basin; wherein
building an ecological slope protection (100) in a land-lake ecozone along the banks of the basin, wherein body of the ecological slope protection (100) extends into the basin water, and has a flexible mattress (110) laid on the surface thereof; an ecological filter pool (120) having a pool body is provided below the flexible mattress (110), and it is isolated from the basin water by sealing the pool body and is contained with a filler layer and a support layer (125) supporting the filler layer; the basin water is introduced into the ecological filter pool (120).

2. The method according to claim 1, characterized in that: the trees are eucalyptus, and optionally through the roots of trees, pollutants are absorbed or fixed to be removed, thereby inhibiting the growth of blue algae.

3. The method according to claim 2, characterized in that: the method further comprises: collecting eucalyptus leaves; delivering eucalyptus leaves or eucalyptus leaf extract into the basin water, wherein the eucalyptus leaf extract is a product after water extraction.

4. The method according to claim 1, characterized in that: the basin water is treated by the filler layer to clean up pollutants therein and reduce an eutrophication level of the basin water; and the treated basin water is discharged from the ecological slope protection (100) via the support layer (125).

5. The method according to claim 4, characterized in that, the filler layer of the ecological filter pool (120) is laminated by four layers from top to bottom as follows:
a first layer, which is a soil layer (121) for allowing the growth of aquatic plants, absorbing heavy metals, degrading organics and removing nitrogen and phosphorus;
a second layer, which is an adjustment layer (122) composed of natural zeolite, limestone and activated carbon for supporting the soil layer (121), adsorbing and fixing heavy metals, nitrogen, phosphorus and organics;
a third layer, which is a biological layer (123) filled with bacteria-loaded activated carbon for adsorbing and fixing heavy metals, degrading organics and removing nitrogen and phosphorus; and
a fourth layer, which is an ecological layer (124) filled with one or more of waste materials comprising fine sand, gravel, steel slag, cinder, construction waste, and waste gypsum for filtering water and intercepting soil.

6. The method according to claim 5, characterized in that, earthworms are stocked in the soil layer (121), and a stocking density of the earthworms is 8 to 12 g (earthworms)/L.

7. The method according to claim 5, characterized in that: the basin water is introduced into the ecological slope protection (100) through a water distribution pipe (130) by means of a water pump, and the water distribution pipe (130) is disposed in the first layer and the soil layer (121) of the ecological slope protection (100), and it is made of PVC with 0.1 to 0.5 cm drain holes distributed thereon to allow water penetrating into the ecological slope protection (100).

8. The method according to claim 7, characterized in that, the ecological slope protection (100) has a modular structure, the body of the ecological filter pool (120) is made of the water-proof sheets and can be assembled and disposed on a site of water treatment and then be loaded with fillers in order, each body individually constructing one ecological filter pool (120);
each ecological slope protection (100) may include one or more ecological filter pool(s) (120), at least two ecological filter pools (120) or a plurality of ecological filter pools (120) stacked in layers and columns, the ecological filter pools (120) on each column are aligned, and adjacent ecological filter pools (120) on each layer are separated at a predetermined interval.

9. The method according to claim 8, characterized in that, for the ecological filter pools (120) on a same column, the drainage pipe of the ecological filter pool (120) on an upper layer is connected with the water distribution pipe (130) of the pool (120) on a lower layer, to discharge the basin water treated by the ecological filter pool (120) on the upper layer into the soil layer (121);
the aeration pipe (140) of the ecological filter pool (120) on the upper layer is connected with the aeration pipe (140) of the pool (120) on the lower layer, to allow air passing through the ecological filter pool (120) on the upper layer and entering the soil layer (121)
the diameter of the aeration pipe (140) of the ecological filter pool (120) on the lower layer is larger than that of the aeration pipe (140) of the ecological filter pool (120) on the upper layer.

10. The method according to claim 8, characterized in that,
a metal wire cage is sheathed on a periphery of each ecological filter pool (120);
compared with the water in a middle of the basin, the water close to the banks of the basin is treated by more layers of the ecological filter pools (120).

11. The method according to claim 7, characterized in that:
an aeration pipe (140), which is a PVC pipe with 0.05 to 0.2 cm air vents distributed thereon, is arranged beside the water distribution pipe (130) disposed in the soil layer (121), and connected with an external fan to aerate.

12. The method according to claim 11, characterized in that: the aeration pipe (140) and the water distribution pipe (130) each individually are wrapped by bluestones with geotextile on their own peripheries.

\* \* \* \* \*